UNITED STATES PATENT OFFICE.

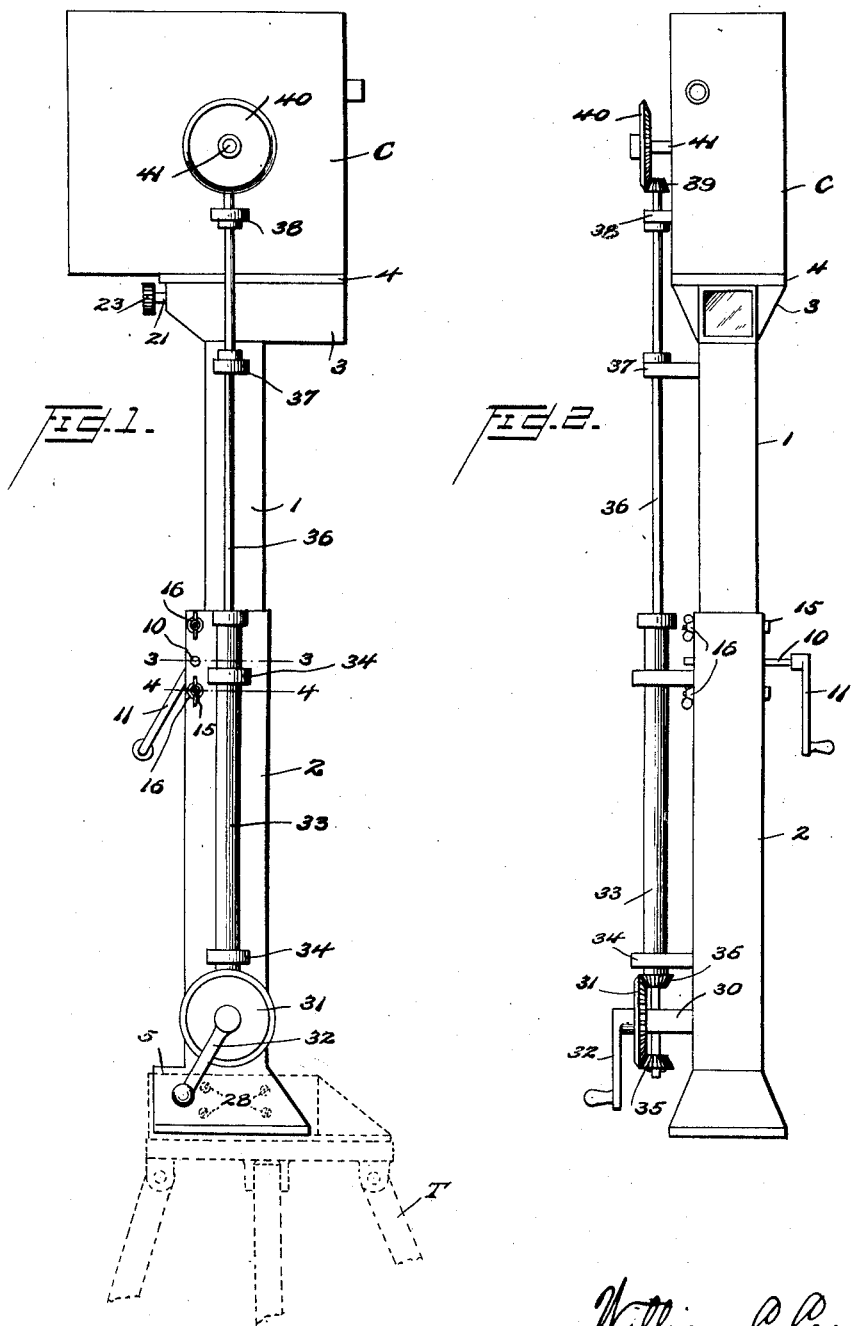

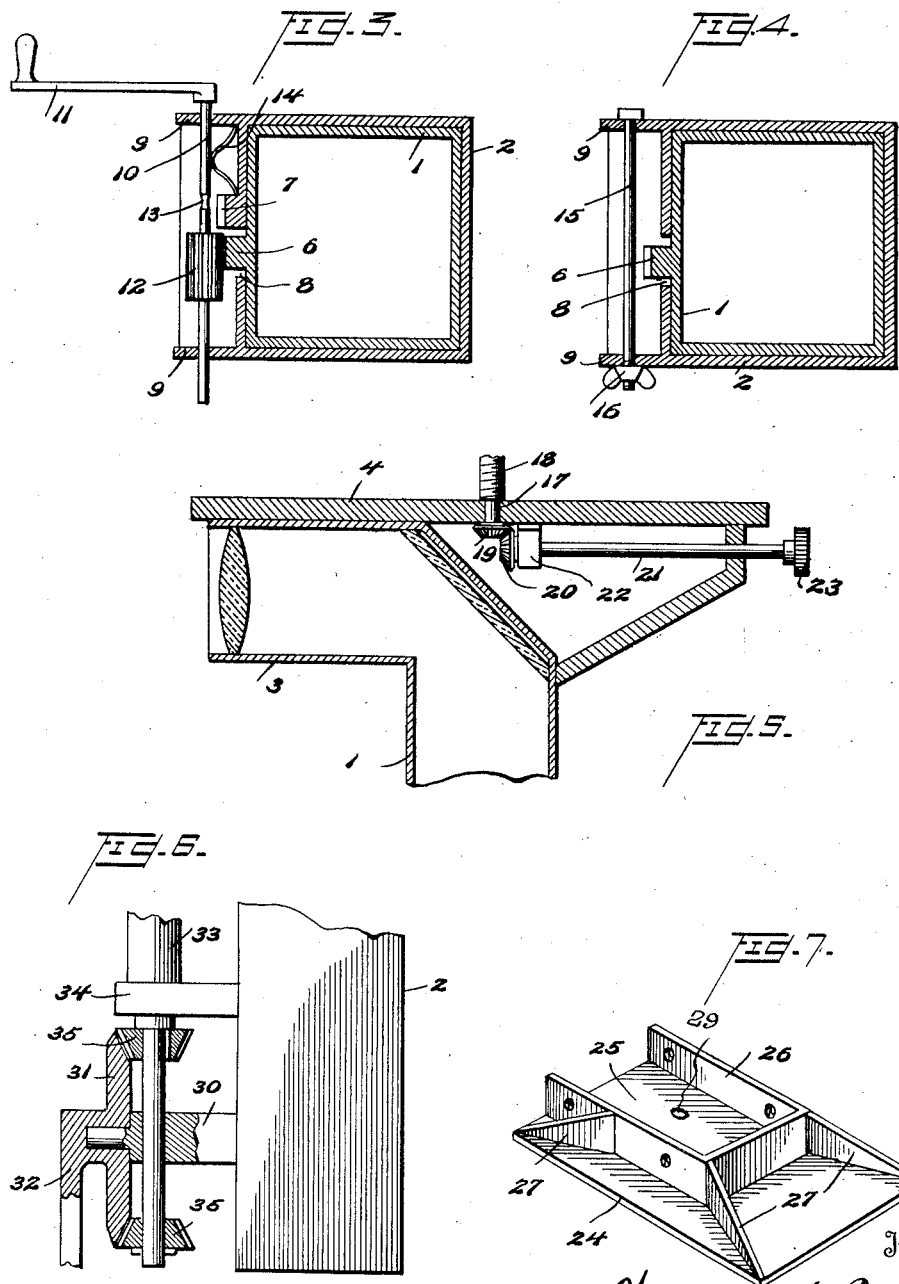

WILLIAM C. COX, OF WASHINGTON, DISTRICT OF COLUMBIA.

PERISCOPE ATTACHMENT FOR MOTION-PICTURE CAMERAS.

1,418,364. Specification of Letters Patent. Patented June 6, 1922.

Application filed June 16, 1920. Serial No. 389,513.

*To all whom it may concern:*

Be it known that I, WILLIAM C. COX, a citizen of the United States of America, residing at Washington, in the District of Columbia, have invented a certain new and useful Improvement in Periscope Attachments for Motion-Picture Cameras, of which the following is a specification.

This invention relates to improvements in optical attachments for motion picture cameras, and it is the principal object of the invention to provide a combined periscope and support for motion picture or similar large and heavy cameras, whereby the same can be successively employed for photographing objects not within focusing range of the camera when in its normal position, that is, upon the stand or tripod usually employed to support the same, thus rendering a camera so equipped advantageously adaptable for use in trench photograph work and like uses where it becomes necessary that the camera employed be arranged above the head of an operator and sufficiently high to clear any obstruction such as the wall of a trench, in order that the object to be photographed may be properly located in its lens, the periscope attachment rendering it possible for the photographer to view an object focused in the camera which is supported in a plane above his head without effort and from his usual position, hence, materially facilitating the "shooting" of the picture.

It is also an object of the invention to provide a periscope attachment of the character mentioned which can be adjusted to various heights, whereby the camera supported thereon can be elevated sufficiently to clear the object or obstruction over which the picture is to be "shot."

Yet another object of my invention may be stated to reside in the provision of a periscope attachment which can be secured to the various makes or designs of motion picture camera stands or tripods now prevalent, with but slight alteration thereto, and which, when in position thereon, will be held against any undue movement or detrimental vibration.

Other objects will be in part obvious and in part pointed out hereinafter.

In order that the invention and its mode of application may be readily understood by persons skilled in the art, I have in the accompanying illustrative drawings, and in the detailed following description based thereon, set out what I believe to be a preferred embodiment of the same.

In these drawings:

Figure 1 is a side elevation of the improved periscope attachment showing the same supporting a motion picture camera and in position upon an ordinary tripod;

Figure 2 is a similar view taken at right angles to the Figure 1;

Figure 3 is a transverse section through the periscope attachment taken on the line 3—3 of Figure 1;

Figure 4 is a similar view taken on the line 4—4 of Figure 1;

Figure 5 is a fragmentary enlarged detail in section showing the camera supporting shelf on the finder end of the periscope and the means for securing the camera thereto;

Figure 6 is an enlarged fragmentary detail in section through the lower portion or observing portion of the periscope showing the gear for transmitting rotary driving motion to the camera shutter; and, Figure 7 is a detail in perspective of one form of bracket employed for securing the periscope attachment to the tripod.

Having more particular reference to the drawings, in connection with which like reference characters will designate corresponding parts throughout the several views, the improved periscope attachment comprises telescopic tubular sections 1 and 2, the section 1 being provided with a right angularly disposed finder end 3 carrying on its upper side a shelf 4 upon which the motion picture camera is adapted to be arranged, while the lower end of the tubular section 2 is provided with an oppositely disposed right angular portion serving as the observing end of the periscope and designated by the numeral 5. It becomes desirable to provide means for extending or telescoping several sections 1 and 2, and to this end, I provide on one side wall of the inner section 1, a series of gear teeth 6 constituting the usual rack while a second and similar series of these teeth 7 are formed on the adjacent wall of the section 2, it being noted in this connection that that wall of the section 2 carrying teeth 7 is slotted as at 8, in order that the series of teeth 6 on the tubular section 1 may extend through such slot to a point in proximity to the teeth 7. The side walls of the section 2 are extended as at 9 and 10 have a transversely disposed shaft 10 journaled in bearings therein, a crank handle 11 being secured to one end of the shaft whereby to facilitate rotation thereof. In this connection, it should be noted that the shaft 10 is slidable in its bearings in the extended portions 9 of the side walls of the telescopic section 2 and that the same carries a pinion 12 thereon rotatable with the same and adapted to be normally enmeshed with the series of teeth 6 extending from the tubular section 1 through the slot 8 in the section 2. Thus, it is obvious that when the shaft 10 is rotated, reciprocatory motion will be imparted to the tubular section 1 in a direction depending upon the direction of rotation, causing said section 1 to be extended or telescoped with relation to the section 2. To secure such section 1 in an adjusted position with relation to the section 2, it is only necessary that the shaft 10 be slid in its bearings in the extensions 9 whereby to bring the pinion 12 into engagement with the adjacent teeth 7 on the immovable section 2. By reason of the fact that the pinion 12 spans the space between the teeth 6 and 7, it naturally follows that the resultant connection between such teeth will serve as an effective locking means as between the sections 1 and 2, retaining said section 1 in its adjusted position. I may and preferably do form a way or seat 13 in the shaft 10 and arrange a curved spring 14 on the section 2 adjacent said shaft in order that when the shaft is slid to one side to effect connection of the pinion 12 between the teeth 6 and 7, said spring will immediately seat in the way 13 and in consequence, temporarily or releasably lock said shaft in adjusted position until positively shifted to its rotating position.

As additional means for securing the sections 1 and 2 in adjusted relation and to prevent vibratory movement of a camera supported on the shelf 4, I preferably pass bolts 15 through the extensions 9, engaging wing nuts 16 with their threaded extremities as shown in the Figure 4. By tightening these bolts and wing nuts, it is obvious that the opposite sides of the section 2 will be drawn inwardly until section 1 is snugly received therein, movement of the opposite walls of the section 2 being permitted by reason of the forming of the slot 8 therein.

To secure a camera C in position upon the shelf 4 against displacement during operation of the same, an upright stub shaft 17 is journaled in bearings in the intermediate portion of the shelf 4 as shown in the Figure 5, the upper end thereof being enlarged and screw threaded as at 18 for engagement with the usual screw threaded opening in the camera C, while a beveled gear 19 is carried on the lower end of the shaft and meshes with a corresponding gear 20 mounted on the adjacent end of a horizontal shaft 21 journaled in bearings 22 carried on the underside of said shelf 4 and having a knurled finger piece 23 arranged on its outer end, whereby rotation of said shaft 21 with the resultant transmission of rotary motion to the screw 18 can be readily effected by a person desiring to secure a camera in position upon the shelf 4.

Various forms of brackets or devices may be employed for attaching the periscope to the shelf or platform of a tripod fragmentally shown in the drawings and indicated at T. However, for the purpose of illustration and convenience, I employ a form of bracket such as indicated in its entirety by the numeral 24 for securing the lower or observing end of the periscope in position upon the tripod platform. This bracket consists of a basal portion 25 having arranged thereon a substantially U-shaped bracket 26 braced with relation to the said basal portion by diagonal webs 27, while securing screws 28 are passed through the sides of said bracket 26 and are adapted to be engaged with the adjacent portion of the section 2 of the periscope. It, of course, will be understood that to engage the periscope in the bracket 24 it is only necessary that the same be moved laterally into engagement with the bracket 26, whereupon connection of the screws 28 between said bracket and periscope is effected. To secure this bracket 24 in position upon tripod platform, I may and preferably do form an opening 29 in the basal portion 25 through which a screw or similar form of fastening device may be passed into engagement with said platform.

With a view towards providing means for transmitting rotary driving motion to the camera shutter, a bearing 30 is arranged on the lower portion of the section 2 and rotatably supports a beveled gear 31 carrying a crank handle 32, the lower end of a shaft 33 which is mounted in bearings 34 on the section 2. is positioned adjacent the beveled gear 31 and is provided with corresponding gears 35, one of which is idle while the other is secured to said shaft 33. These gears, as shown in the figure, engage with the opposite sides of beveled gear 31 and upon rotation of said gear through the medium of this crank handle 32, rotary motion will be imparted to the shaft 33. This shaft 33 is hollow and receives therein one portion of a flexible shaft 36, which shaft, is in turn, journaled in bearings 37 and 38 arranged on the section 1 and the camera C respectively, a beveled gear 39 being affixed to the upper end of the flexible shaft and meshing with a beveled gear 40 carried on the shutter operating shaft 41 of the camera C.

In arranging the camera C on the shelf 4 arranged on the upper side of the finder end of the periscope attachment, the lens of the camera is accurately aligned with the finder lens of the periscope, so that the view reflected or focused in the camera will correspond accurately to the view reflected in the observing end 5 of the periscope.

With my improved periscope attachment, it will be appreciated that I provide a device possessing practical and meritorious features. The device may be used to advantage in military photographic operations such as in trench work, wherein it oftentimes becomes necessary or at least desirable to secure a photograph of certain positions of an enemy. To do this, it is necessary that the camera be raised upon the walls of the trench in order that the lens thereof will be provided with a clear and unobstructed view. The photographing of pictures of this nature is usually carried out by the raising of the camera to a point upon the trench wall, pointing same in the general direction of the object to be photographed and then "shooting" the same blindly. Such procedure frequently gives unsatisfactory results and in consequence, entails considerable expense, in addition to loss of time and labor. With my device, the camera when in an elevated position, can be accurately directed so as to focus the entire object to be photographed, such object being clearly reflected in the observing end 5 of the periscope and in consequence, eliminating "at random" shots. A user of my device further, is not compelled to change his usual position irrespective of the elevation of the camera and hence, does not have to expose any portion of his body to the fire of the enemy.

The device also possesses considerable commercial merit, as for illustration, in the photographing of parades, etc., at which times, the position of the photographer is often such that he must support his camera upon a specially constructed platform, ladder, or other device, in order that he may have an unobstructed view over the heads of persons or other objects in front of him.

With my device, it is only necessary that the periscope be extended to a point whereat the camera will be sufficiently elevated to afford a clear and unobstructed view in the observing end 5 of the periscope attachment whereupon objects may be photographed.

Manifestly, the construction shown is capable of considerable modification and such modification as is within the scope of my claims, I consider within the spirit of my invention.

I claim:

1. An attachment of the character described, comprising a periscope composed of telescopically engaged sections, a series of teeth on one wall of the outer section, said section having a longitudinal slot formed therein adjacent the series of teeth, a second series of teeth on the adjacent wall of the inner section extending through said slot to a point in proximity to the first series of teeth, a shaft slidably mounted in bearings in the outer section carrying a pinion normally meshing with the second series of teeth but engageable, at times, with said first series of teeth to lock the several telescopic sections in adjacent relation, camera supporting means on the finder end of the periscope, and means on one side of the periscope for transmitting driving motion to the camera shutter.

2. In combination with a periscope attachment for cameras having camera attaching means on the finder end thereof, a tripod for supporting the periscope attachment, a bracket on said tripod for receiving said attachment comprising a basal portion having a substantially U-shaped bracket thereon into which the observing end of the attachment is laterally introduced, and means for effecting connection between said U-shaped bracket and the observing end of the attachment.

WILLIAM C. COX.